United States Patent
Zhang et al.

(10) Patent No.: US 9,584,503 B2
(45) Date of Patent: Feb. 28, 2017

(54) AUTHENTICATION TO A REMOTE SERVER FROM A COMPUTING DEVICE HAVING STORED CREDENTIALS

(71) Applicant: VMware, Inc., Palo Alto, CA (US)

(72) Inventors: Jinshan Zhang, Beijing (CN); Yueting Zhang, Beijing (CN); Jian Mu, Beijing (CN); YiQun Yun, Beijing (CN); Qiao Huang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 124 days.

(21) Appl. No.: 14/308,801

(22) Filed: Jun. 19, 2014

(65) Prior Publication Data

US 2015/0373010 A1 Dec. 24, 2015

(51) Int. Cl.
*H04L 29/06* (2006.01)
*G06K 9/00* (2006.01)

(52) U.S. Cl.
CPC ........ *H04L 63/083* (2013.01); *G06K 9/00355* (2013.01)

(58) Field of Classification Search
USPC .............................................. 715/740; 726/7
See application file for complete search history.

(56) References Cited

U.S. PATENT DOCUMENTS

| | | | | |
|---|---|---|---|---|
| 2013/0132856 | A1* | 5/2013 | Binyamin | G06F 3/017 715/740 |
| 2014/0101740 | A1* | 4/2014 | Li | G06F 21/32 726/7 |
| 2015/0288687 | A1* | 10/2015 | Heshmati | H04L 63/0861 726/7 |

* cited by examiner

*Primary Examiner* — Jeffrey Pwu
*Assistant Examiner* — Samuel Ambaye

(57) ABSTRACT

Authentication to a remote-server from a computing device having stored credentials for the remote server is described. In one example, a method of authenticating a user to a remote server through a client application executing on a computing device includes: receiving, by the client application, a request to authenticate the user to the remote server using credentials stored on the computing device; prompting, by the client application, the user for gesture-based password; authenticating, by the client application, the gesture-based password; and sending, by the client application, the stored credentials to the remote server for authentication in response to successful authentication of the gesture-based password.

17 Claims, 8 Drawing Sheets

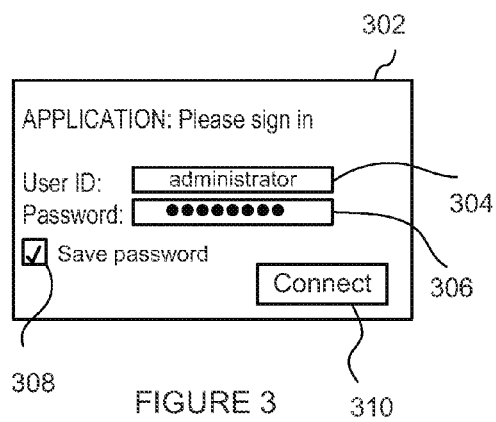
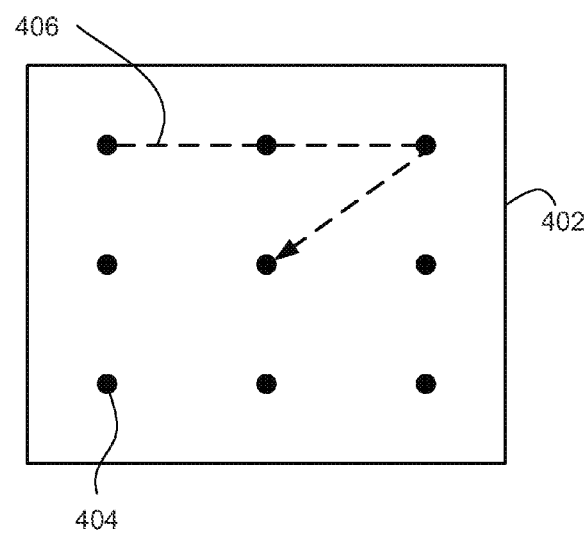
FIGURE 3
FIGURE 4
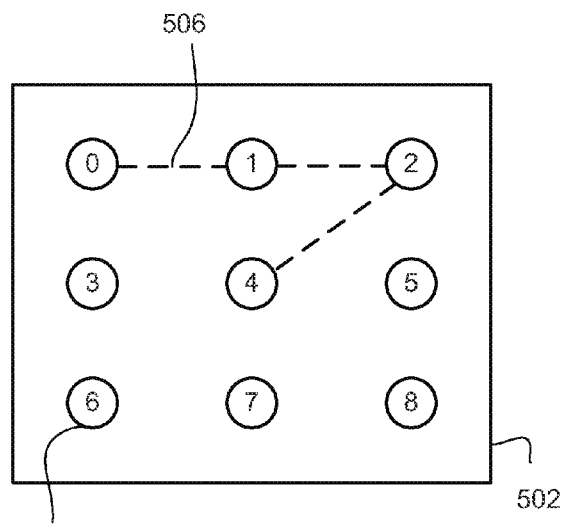
FIGURE 5

AUTHENTICATION TO A REMOTE SERVER FROM A COMPUTING DEVICE HAVING STORED CREDENTIALS

BACKGROUND

Modern computing systems provide various methods for user authentication. A common authentication technique only has a password requirement: The user enters his or her user identifier, and then a secret password that only the user knows. This is referred to as single-factor authentication, since it only relies on what the user knows. Some applications or devices allow a user to remember an identifier and password that has been successfully authenticated so that the user does not have to repeatedly enter the identifier/password for each authentication attempt. While stored credentials are convenient for the user, there is a risk of unauthorized use of the application/device by another party. The risk of unauthorized use of stored credentials is even greater when the credentials are stored on a mobile device.

SUMMARY

One or more embodiments of the present invention provide authentication to a remote server from a computing device having stored credentials for the remote server. In one example, a method of authenticating a user to a remote server through a client application executing on a computing device, comprising: receiving, by the client application, a request to authenticate the user to the remote server using credentials stored on the computing device; prompting, by the client application, the user for gesture-based password; authenticating, by the client application, the gesture-based password; and sending, by the client application, the stored credentials to the remote server for authentication in response to successful authentication of the gesture-based password.

In another example, a computing system configured to support access to a remote server over a network, comprising: at least one sensor to identify human gestures; and a processor to run a client application programmed to provide a first component that receives a request to authenticate a user to the remote server using stored credentials, and a second component that prompts a user for gesture-based password comprising at least one human gesture using the at least one sensor and sends the stored credentials to the remote server for authentication in response to successful authentication of the gesture-based password.

Further embodiments of the present invention include a non-transitory computer readable storage medium that includes instructions that enable a processing unit to implement one or more aspects of the above method, as well as a computer system configured to implement one or more aspects of the above method.

BRIEF DESCRIPTION OF THE DRAWINGS

FIG. 3 illustrates a GUI component that can be used by a client application according to an example implementation.

FIG. 4 illustrates a GUI component that can be used by a client application according to an example implementation.

FIG. 5 illustrates another GUI component that can be used by a client application according to an example implementation.

DETAILED DESCRIPTION

Figure 1:
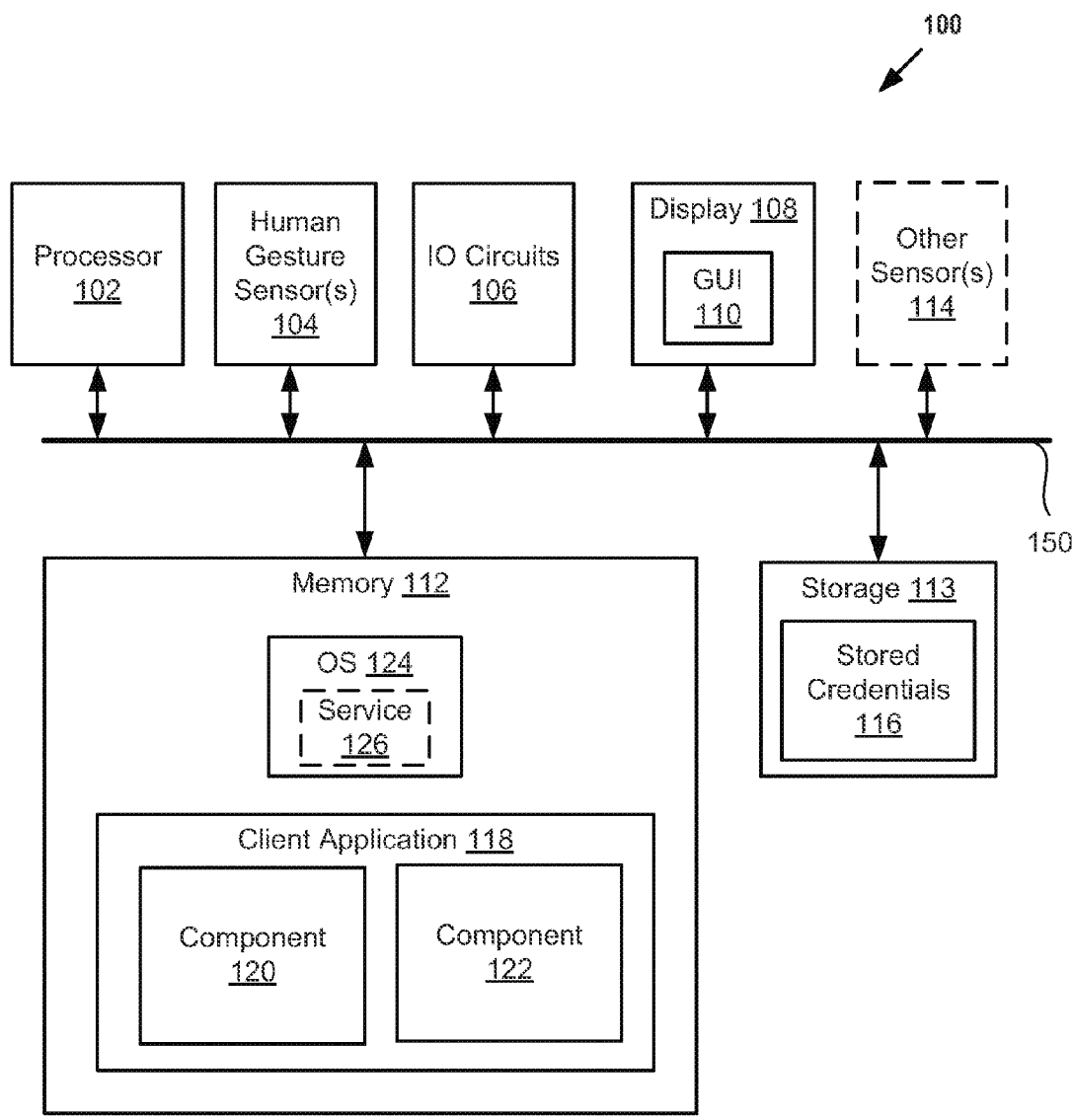
FIG. 1 is a block diagram depicting a client computing device according to an example implementation.

FIG. 1 is a block diagram depicting a computing device 100 according to an example implementation. Computing device 100 can be any type of computing device, including a mobile computing device such as a mobile telephone, tablet, notebook computer, and the like. Computing device 100 includes a processor 102, at least one human gesture sensor ("human gesture sensor(s) 104"), input/output (IO) circuits 106, a display 108, and a memory 112. In some examples, computing device 100 includes at least one additional sensor ("other sensors 114"), as discussed below.

Processor 102 can include one or more microprocessors or microprocessor cores known in the art. Human gesture sensor(s) 104 can include one or more sensors for detecting human gestures. For example, human gesture sensor(s) 104 can include a touch-sensitive device (e.g., touch screen, trackpad, etc.), fingerprint scanner, voice capture device (e.g., microphone), video camera, or like device configured to detect human gestures or any combination of such devices. IO circuits 106 include various circuits to send data from, or receive data to, client computing device 100. For example, IO circuits 106 can include a network interface to communicate with remote computing resources over a network. Display 108 can be any type of display, such as computer monitor, tablet display, mobile phone display, or the like. One or more of human gesture sensor(s) 104 may be integrated with display 108. Display 108 is configured to display graphic user interface (GUI 110) through which a user can interact with client computing device 100.

Processor 102 is configured to execute instructions, which can be stored in memory 112, to perform various functions for client computing device 100. Memory 112 can include one or more volatile or non-volatile memory circuits, such as random access memory (RAM), read only memory (ROM), flash memory, or the like. Memory 112 stores operating system (OS) 124 and a client application 118, which are executed by processor 102. Computing device 100 can also include storage 113, which can include disc drive storage, solid state storage, or the like.

In an embodiment, OS 124 includes a service 126. Service 126 can be part of a distributed service configured to communicate with a remote server. For example, service 126 can be part of a remote desktop service used to interact with a desktop running on a remote server. In general, service 126 is any type of service that utilizes authentication of users before the users can access the service and the remote server. Client application 118 can interact with OS 124 to access the remote server through service 126.

In another embodiment, client application 118 acts as a client for a remote server, wherein the remote server requires authentication before granting user access. That is, client application 118 accesses the remote server directly without going through service 126. In such an embodiment, service 126 may be omitted. For example, client application 118 can be a mobile client for operating a remote desktop, wherein the remote desktop requires users to provide credentials (e.g., a user may be asked to type in character-based passwords) for access. By way of example, client application 118 is described below as authenticating to a remote server directly.

Application 118 includes a component 120 and a component 122. Component 120 is configured to obtain credentials from a user and interact with a remote server to authenticate a user. Component 120 can use GUI 110 to interact with the user and obtain the credentials. Example credentials include a username or other type of user identifier and a password or other type of secret key. In general, credentials for the remote server can be any type of token or electronic data used to authenticate to the remote server and capable of being stored on computing device 100. The remote server can employ any type of authentication protocol to authenticate user credentials, such as Kerberos, central authentication service (CAS), extensible authentication protocol (EAP), challenge-handshake authentication protocol (CHAP) or variants thereof, and the like.

Component 120 provides an option to store user credentials in computing device 100 after successful authentication. The user credentials ("stored credentials 116") can be stored in storage 113 and/or memory 112. Before storing the user credentials, client application 118 invokes component 122 to establish gesture credentials for the user (also referred to as a "gesture-based password"). Gesture credentials can include at least one human gesture capable of being captured by human gesture sensor(s) 104. For example, gesture credentials can include at least hand gesture captured by a touch-sensitive sensor or device on computing device 100. Component 122 can interact with GUI 110 and human gesture sensor(s) 104 to obtain the gesture credentials. Gesture credentials (or representation thereof) can be stored as part of stored credentials 116.

In an example, client application 118 requires the user to establish gesture credentials prior to storing credentials for accessing the remote server. If the user elects to establish gesture credentials, client application 118 allows credentials for the remote server to be stored. Otherwise, client application 118 will prevent credentials from being stored for the remote server.

If credentials for accessing the remote server are stored, component 120 retrieves the credentials from stored credentials 116 when user requests access. Client application 118 will not immediately attempt authentication to the remote server with the stored credentials. Rather, client application 118 will invoke component 122 in response to an authentication request with stored credentials. Component 122 will interact with GUI 110 and human gesture sensor(s) 104 to capture samples of human gestures from the user to be used as gesture credentials. Component 122 compares the sampled gesture credentials with the predefined gesture credentials established by component 122 when credentials for the remote server were first stored. If gesture authentication is successful, component 122 indicates success to client application 118. Client application 118 allows component 120 to proceed with authentication to remote server using the stored credentials (e.g., username and password). If gesture authentication is not successful, component 122 indicates failure to client application 118. In case of gesture authentication failure, component 122 or client application 118 can remove stored credentials for the remote server from stored credentials 116. Component 120 will request the user to re-enter credentials for accessing the remote server. Component 122 can allow the user a threshold number of attempts to enter gesture credentials before indicating authentication failure.

In this manner, computing device 100 can store or cache user credentials for accessing a remote server more securely. If an unauthorized user attempts to access the remote sever using stored credentials, the unauthorized user will be required to enter the established gesture credentials. Assuming the established gesture credentials are secret, the potential for unauthorized access to the remote server with stored credentials is minimized (depending on complexity of the established gesture credentials). At the same time, the authorized user is still afforded the convenience of storing credentials for accessing the remote server after successful authentication. Gesture credentials can be configured to be more easily entered than credentials for the remote server (e.g., username and password).

In an example, to further improve security, component 122 can cooperate with other sensor(s) 114 to add another layer of complexity to authentication of gesture credentials. Other sensor(s) 114 can include sensors configured to measure motion, orientation, or both motion and orientation of client computing device. Other sensor(s) 114 can include, for example, an accelerometer, a magnetometer (e.g., compass), a gyroscope, or the like to measure forces applied to computing device 100 at any moment in time, an angle computing device 100 is rotated relative to Earth's magnetic north pole, rotational velocity of computing device 100, or the like. When gesture credentials are established, component 122 can obtain indicia of motion and/or orientation of computing device 100 from other sensor(s) 114 and combine the indicia with human gesture(s) to implement more complex gesture credentials. A user must impart the same motion and/or orientation to computing device 100 while entering the human gesture(s) for subsequent authentication to be successful. In some examples, component 122 can implement error thresholds for motion and/or orientation of computing device 100 in which authentication can be successful.

Figure 2:
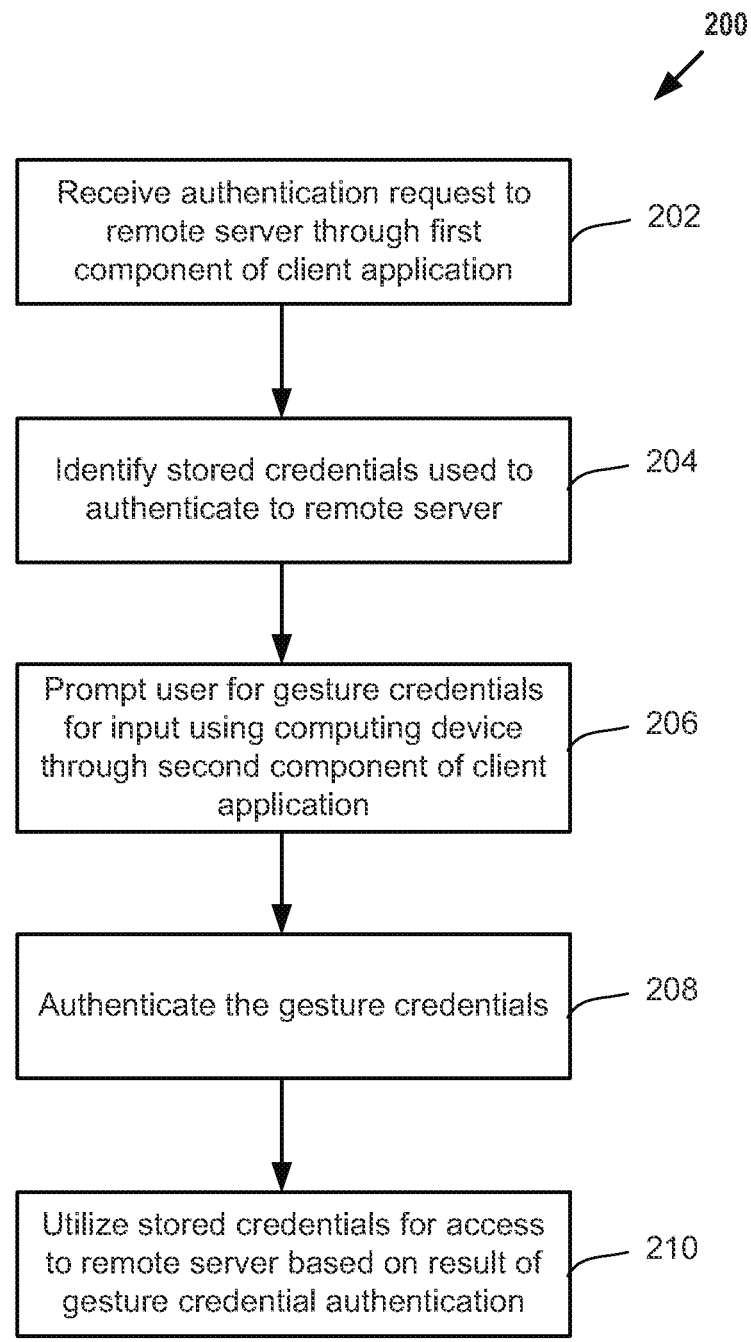
FIG. 2 is a flow diagram depicting a method of authenticating a user to a remote server through a client application executing on a computing device according to an example implementation.

FIG. 2 is a flow diagram depicting a method 200 of authenticating a user to a remote server through a client application executing on a computing device according to an example implementation. The method 200 can be understood with reference to computing device 100 shown in FIG. 1. The method 200 begins at step 202, where client application 118 receives an authentication request to remote server through component 120. At step 204, component 120 identifies stored credentials used to authenticate to the remote server (e.g., in stored credentials 116). At step 206, component 122 prompts the user for gesture credentials input using computing device 100 (e.g., using human gesture sensor(s) 104). At step 208, component 122 authenticates the gesture credentials. At step 210, component 120 utilizes the stored credentials to access the remote server based on the result of the gesture credential authentication.

FIG. 3 illustrates a GUI component 302 of GUI 110 of the client application that can be used by a user to enter credentials for the remote server according to an example implementation. GUI component 302 includes a user ID field 304, a password field 306, a save password checkbox 308, and a connect button 310. A user inputs credentials to user ID field 304 and password field 306. A user can save the credentials using save password checkbox 308. A user can request authentication using connect button 310. GUI component 302 is one of a myriad of example GUI components that can elicit user credentials, request that such credentials be saved, and request authentication.

FIG. 4 illustrates a GUI component 402 of GUI 110 that can be used by client application 118 according to an example implementation. GUI component 402 includes an array of touch areas 404 (e.g., a 3×3 array is shown). Touch areas 404 are indicated using filled circles, but any graphical indicia can be used. Dashed line 406 indicates a touch gesture having an order in which a user must interact with touch areas 404. For example, the touch gesture can include taps or multi-touches, such as tap and drag.

FIG. 5 illustrates a GUI component 502 of GUI 110 that can be used by client application 118 according to an example implementation. GUI component 502 includes an array of touch areas 504 (e.g., a 3×3 array is shown), each of which includes an alphanumeric digit (e.g., numbers 0-8 are shown). Dashed line 506 indicates a touch gesture having an order in which a user must interact with touch areas 504, e.g., 0-1-2-4. For example, the touch gesture can include taps or any type of multi-touch (e.g., tap and drag).

Figure 6:
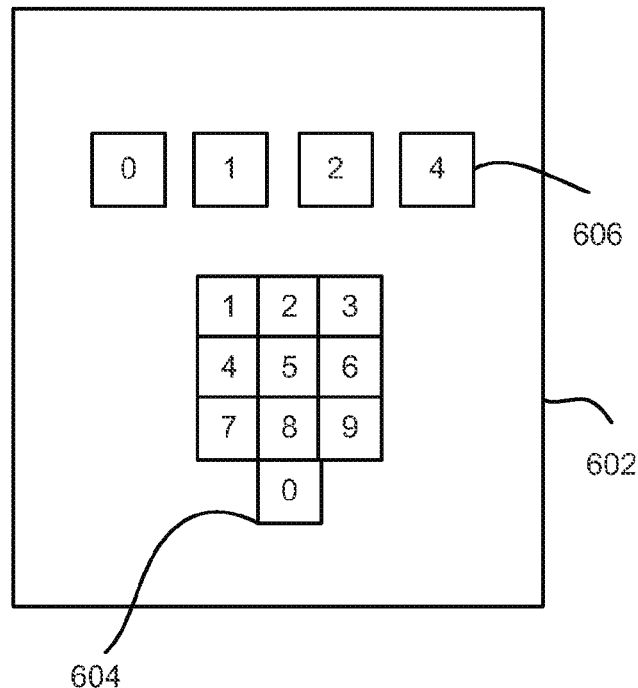
FIG. 6 illustrates yet another GUI component that can be used by a client application according to an example implementation.

FIG. 6 illustrates a GUI component 602 of GUI 110 that can be used by client application 118 according to an example implementation. GUI component 602 includes a numeric keypad 604 and a plurality of text boxes 606. A user can interact with numeric keypad 604 to enter numeric digits into text boxes 606, which will establish a personal identification number (PIN), e.g., 0124. In this example, the touch gesture can be a series of taps on the keypad 604.

FIGS. 4-6 show three examples of a myriad of potential GUI components for soliciting gesture credentials. While the examples involve the use of touch gestures, a GUI component can be provided to solicit other types of human gestures, such as voice, fingerprint, video, or the like.

Figure 7:
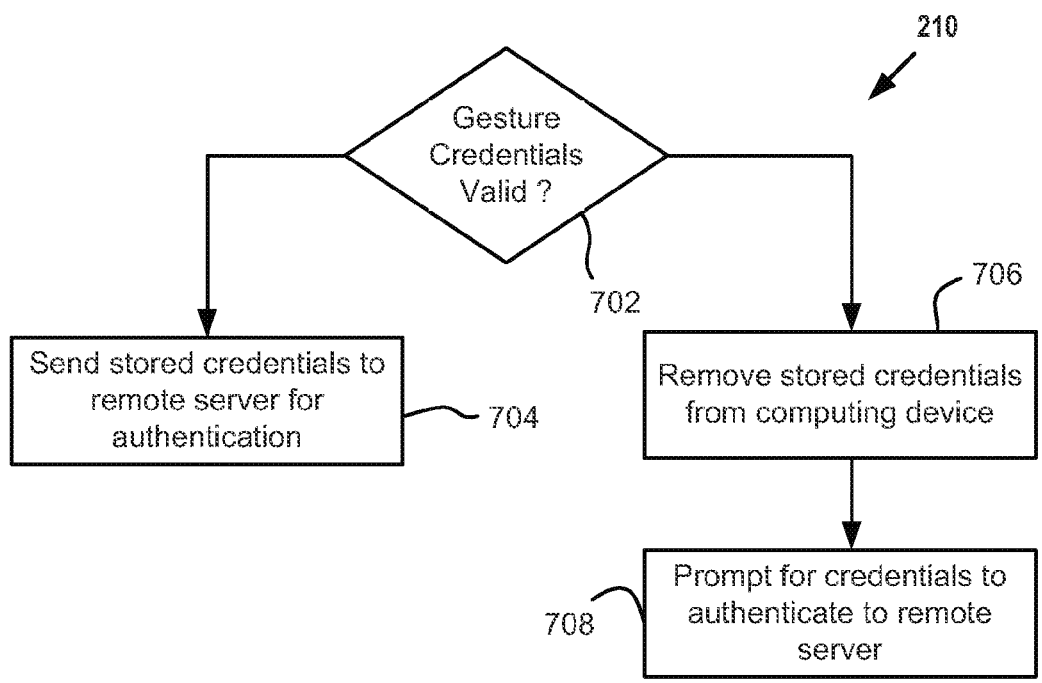
FIG. 7 is a flow diagram depicting an example of utilizing stored credentials for a remote server based on a result of gesture authentication.

FIG. 7 is a flow diagram depicting an example of step 210 of utilizing stored credentials to access a remote server based on a result of gesture authentication. At step 702, component 122 determines whether entered gesture credentials are valid (e.g., the entered gesture credentials match the predefined gesture credentials). If so, at step 704, component 120 sends the stored credentials to the remote server for authentication. If the gesture credentials are not valid, client application 118 removes the stored credentials for the remote server from computing device 100. At step 708, component 120 can prompt for credentials to authenticate to the remote server.

Figure 8:
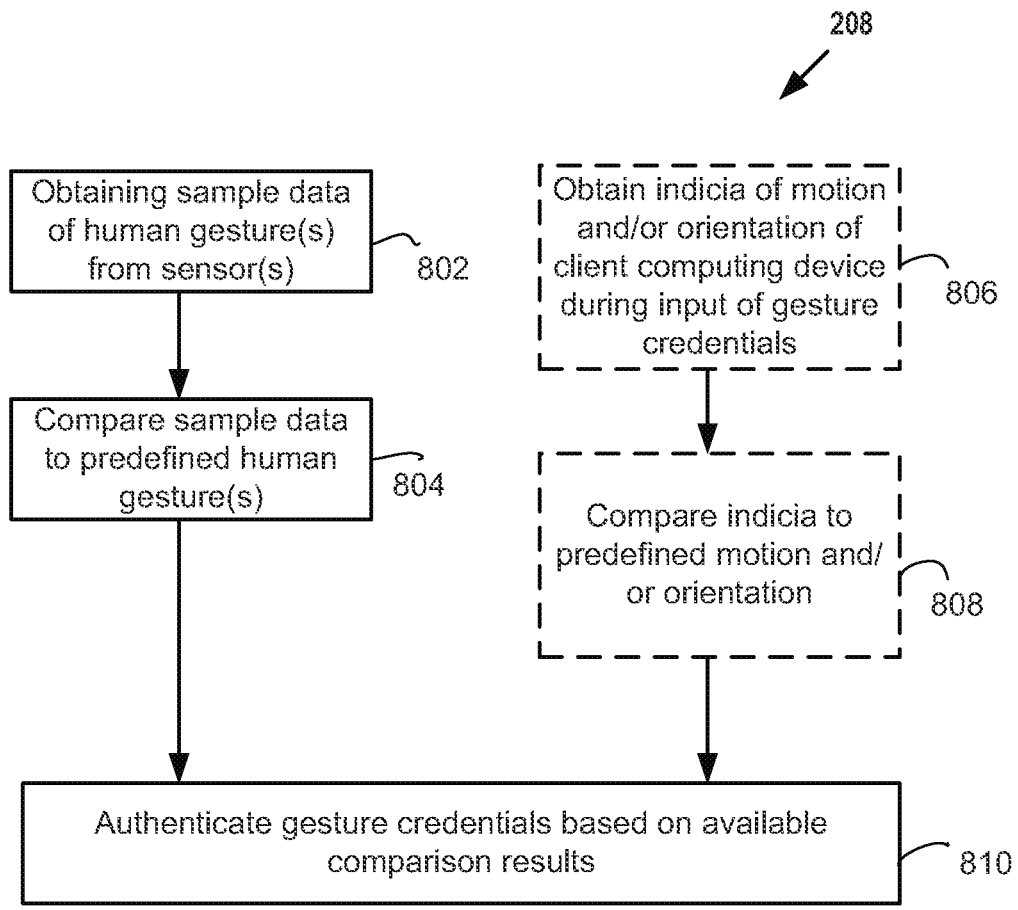
FIG. 8 is a flow diagram depicting an example of authenticating a gesture-based password.

FIG. 8 is a flow diagram depicting an example of step 208 of authenticating gesture credentials. At step 802, component 122 obtains sample data of human gesture(s) from human gesture sensor(s) 104. At step 804, component 122 compares the sample data to predefined human gesture(s) previously established when credentials for accessing the remote server were stored. At step 810, component 122 authenticates the gesture credentials based on available comparison results.

In an example, optionally at step 806, component 122 obtains indicia of motion and/or orientation of computing device 100 during input of gesture credentials. At step 808, component 122 compares the indicia to predefined motion and/or orientation indicia. At step 810, component 122 authenticates gesture credentials based on available com-parison results, which includes both human gestures and motion/orientation. In one embodiment, the gesture authentication component 122 can receive both human gestures and indicia of motion/orientation of computing device 100 and use them for user authentication.

Figure 9:
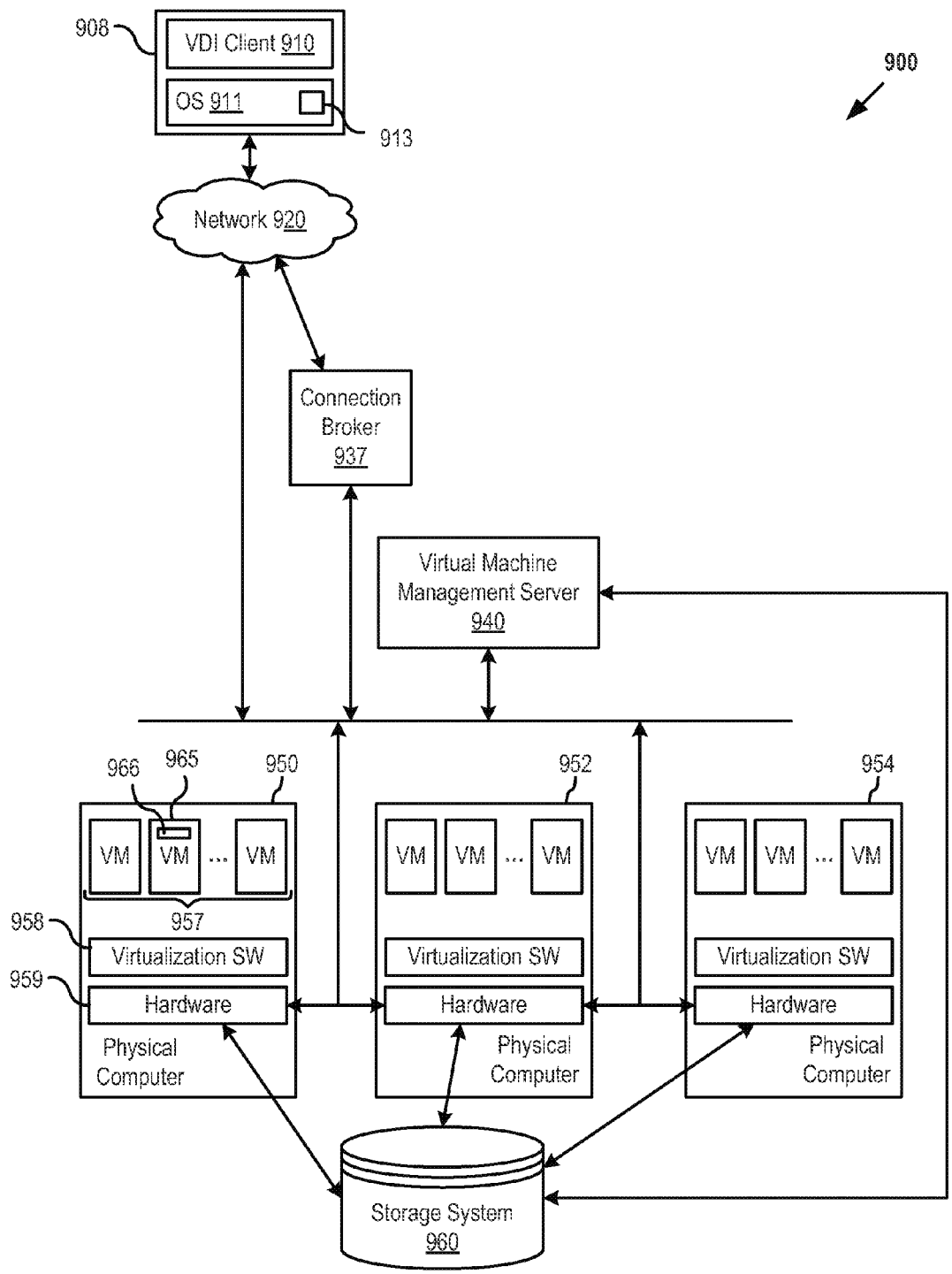
FIG. 9 illustrates components of a virtualized desktop infrastructure (VDI) system in which one or more embodiments of the present invention may be implemented.

FIG. 9 illustrates components of a virtualized desktop infrastructure (VDI) system 900 in which one or more embodiments of the present invention may be implemented. In VDI system 900, VDI client software programs (also referred to as "VDI clients" for short), e.g., VDI client 910, run on operating systems of local computing devices, e.g., client computing device 908 on top of an operating system (OS) 911. VDI clients provides an interface for the users to access their desktops, which may be running in one of virtual machines 957 or blade server (not shown) in a data center that is remote from the user locations. The term, "desktop" refers to the instance of an interactive operating environment provided by a computer operating system and software applications, typically in the form of a display and sound output and keyboard and mouse input. With VDI clients, users can access desktops running in a remote data center through network 920, from any location, using a general purpose computing device running a commodity operating system and a VDI client software program.

VDI system 900 includes a connection broker 937 that manages connections between VDI clients and desktops running in virtual machines 957 or other platforms. Connection broker 937 may run on a physical server or in a virtual machine running on a server. In example implementations, desktops are running in virtual machines 957 and virtual machines 957 are instantiated on a plurality of physical computers 950, 952, 954, each of which includes virtualization software 958 and hardware 959, is controlled by a virtual machine management server 940, and is coupled to a shared persistent storage system 960.

All of the components of VDI system 900 communicate via network 920. For simplicity, a single network is shown but it should be recognized that, in actual implementations, the components of VDI system 900 may be connected over the same network or different networks. Furthermore, a particular configuration of the virtualized desktop infrastructure is described above and illustrated in FIG. 9, but it should be recognized that one or more embodiments may be practiced with other configurations of the virtualized desktop infrastructure.

OS 911 can include a service 913 for remotely accessing desktops of guest operating systems running on VMs 957. VDI client 910 can implement the functionality of client application 118 described above, namely, the functions performed by component 120 and component 122. Thus, in an example, methods and techniques for authenticating a user to a remote server through a client application described above are applicable to instances where the remote server provides a remote desktop of the user and the application is a client used to access the remote desktop. The remote desktops can be executing on virtual machines.

Figure 10:
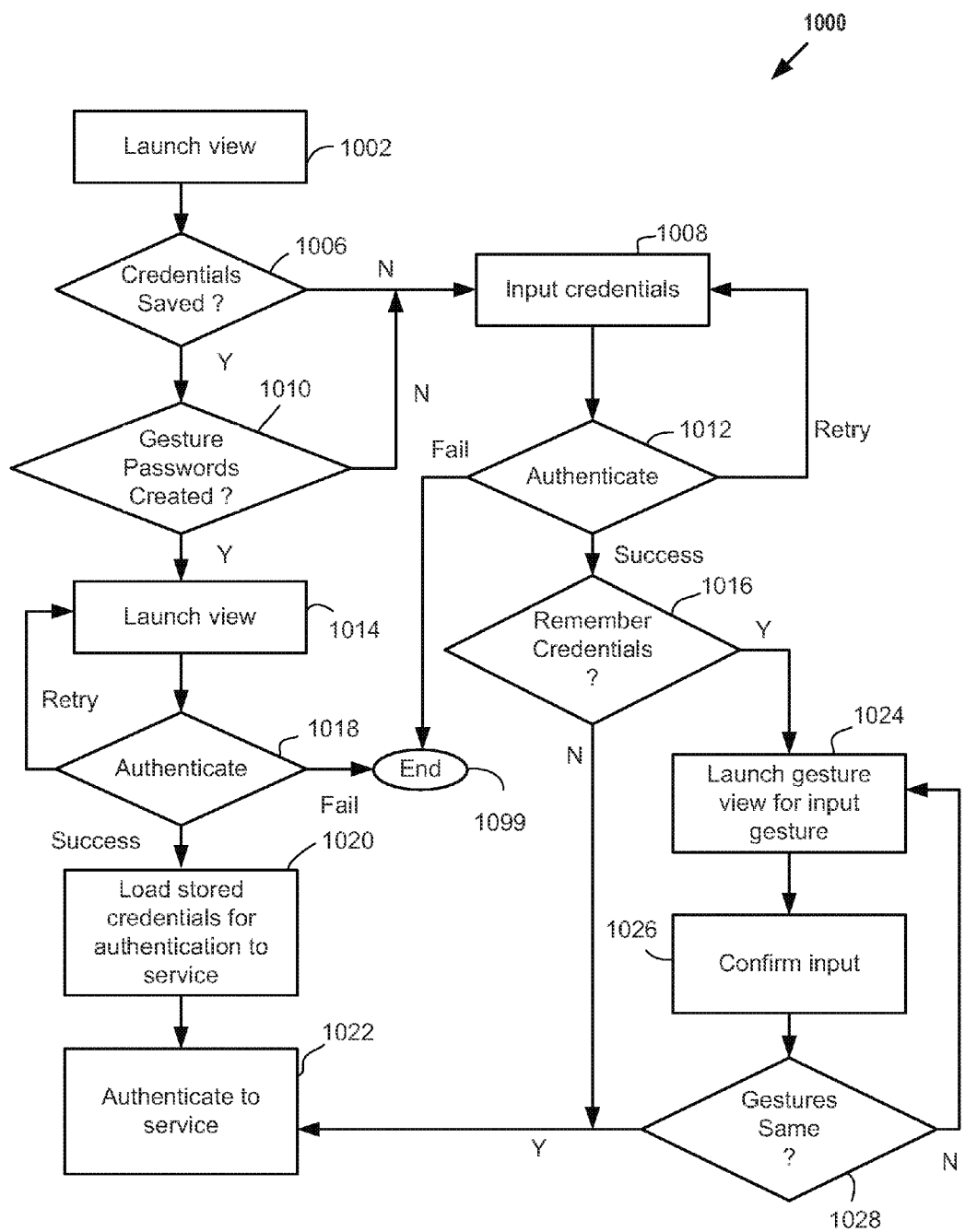
FIG. 10 is a flow diagram depicting a method of authenticating a user to a remote desktop service through a client application executing on a computing device according to another example implementation.

FIG. 10 is a flow diagram depicting a method 1000 of authenticating a user to a remote desktop on a remote server through a VDI client executing on a computing device according to an example implementation. Aspects of method 1000 may be understood with reference to FIG. 9. Method 1000 begins at step 1002, VDI client 910 launches a view that allows a user to access remote desktop. In one embodiment, the user is connected to the remote desktop via a connection broker.

At step 1006, VDI client 910 determines whether the credentials have been previously saved for the remote desktop. If so, method 1000 proceeds to step 1010. Otherwise, method 1000 proceeds to step 1008. At step 1010, VDI client 910 determines whether gesture passwords for the stored credentials have been created. If so, method 1000 proceeds to step 1014. Otherwise, method 1000 proceeds to step 1008. At step 1014, VDI client 910 launches a view so that the user can enter gesture passwords for verification.

At step 1016, VDI client 910 authenticates the entered gesture credentials. If authentication is successful, method 1000 proceeds to step 1020. If authentication is unsuccessful, method 1000 can return to step 1014 and the user can be given the opportunity to reenter the gesture credentials (retry). The user can be given one or more attempts to enter valid gesture credentials. If the user fails to enter valid gesture credentials after a threshold number of attempts, method 1000 ends at step 1099. At step 1020, VDI client 910 loads stored credential for authentication to remoter desktop service 913. At step 1022, VDI client 910 sends the stored credentials to the remote desktop for authentication.

If at step 1006 credentials were not saved, or at step 1010 gesture credentials were not set, method 1000 proceeds to step 1008. At step 1008, VDI client 910 requests the user to enter credentials for the remote server. At step 1012, VDI client 910 sends the credentials entered by the user to the remote server for verification. If the remote server indicates that the verification is successful, method 1000 proceeds to step 1016. If the remote server indicates that the authentication is unsuccessful, method 1000 can return to step 1008 and the user can be given the opportunity to reenter the credentials (retry). The user can be given one or more attempts to enter valid credentials. If the user fails to enter valid credentials after a threshold number of attempts, method 1000 ends at step 1099.

At step 1016, VDI client 910 determines if the credentials for service 913 should be saved and stored on client computing device 908, depending on whether the remote server indicates that the verification is successful. If not, method 1000 proceeds to step 1022. Otherwise, method 1000 proceeds to step 1024. At step 1024, VDI client 910 launches a gesture view for the user to create gesture credentials. At step 1026, VDI client 910 may ask the user to confirm the gesture credentials. For example, the VDI client 910 can ask the user to reenter the gesture credentials for purposes of verification. At step 1028, VDI client 910 determines if the instances of gesture credentials entered by the user are the same. If so, method 1000 proceeds to step 1022. Otherwise, method 1000 returns to step 1024 and the user is given another opportunity to enter gesture credentials.

Figure 11:
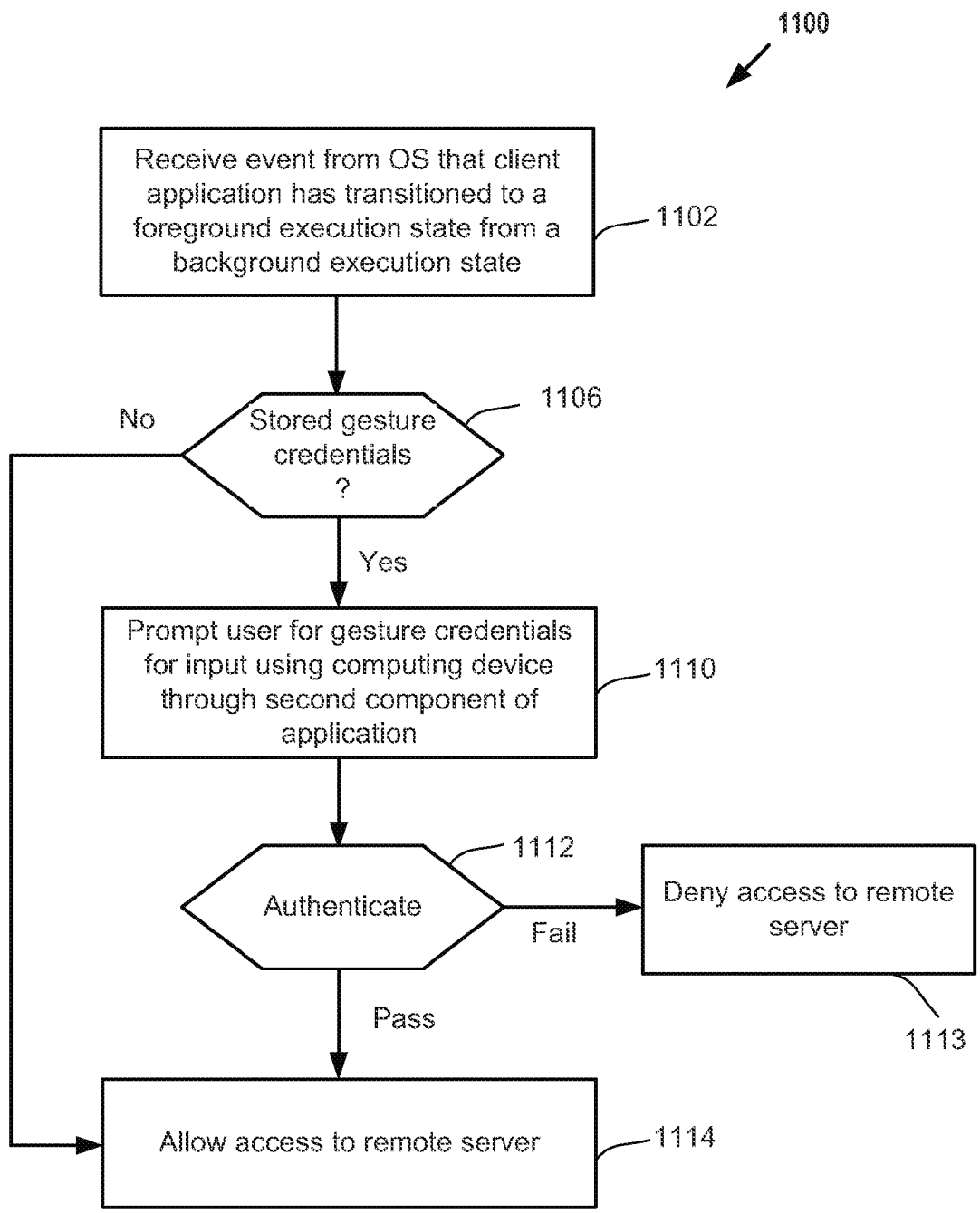
FIG. 11 is a flow diagram depicting a method of authenticating a user to a remote server through a client application executing on a computing device according to another example implementation.

FIG. 11 is a flow diagram depicting a method 1100 of authenticating a user to a remote server through a client application executing on a computing device according to another example implementation. Method 1100 can be understood with reference to computing device 100 shown in FIG. 1. Method 1100 begins at step 1102, where client application 118 receives an event from OS 124 that client application 118 has transitioned to a foreground execution state from a background execution state. OS 124 can support multitasking of a plurality of applications. OS 124 can transition one or more applications to a background execution state, while bringing another application to a foreground execution state. In the background execution state, OS 124 does not terminate an application, but rather suspends at least a portion of the application. OS 124 can save the execution context of an application at the time when the application transitions to the background (e.g., the state of the GUI). The OS 124 can attempt to restore a saved execution context when transitioning an application to a foreground execution state. For example, client application 118 can remain in a live session with the remote server while in the background execution state. When OS 124 transitions client application 118 to a foreground execution state, client application 118 can attempt to resume the live session.

For example, a user can explicitly cause client application 118 to enter a background execution state by interacting with computing device 110 and OS 124 to run another application. In another example, a user can cause client application 118 to enter a background execution state by interacting with computing device 100 and OS 124 to enter another execution mode, such as a sleep mode. The user can interact with computing device 110 and OS 124 to cause client application 118 to return to a foreground execution state.

At step 1106, component 120 checks for stored gesture credentials. If computing device 100 does not have stored gesture credentials, method 1100 proceeds to step 1114, where client application 118 allows access to the remote server. If computing device 100 stores gesture credentials, method 1100 proceeds to step 1110. At step 1110, component 122 prompts the user for gesture credentials for input using computing device 100. At step 1112, component 122 authenticates input gesture credentials. If authentication is successful, method 1100 proceeds to step 1114, where client application 118 allows access to the remote server. If authentication is unsuccessful, method 1100 proceeds to step 1113, where client application 118 denies access to the remote server.

In some examples, remote server can implement a timeout, where a live session is terminated due to a lack of user activity. In such examples, when client application 118 allows access to the remote server at step 1114, the remote server can allow a live session to resume, or can indicate that the live session has been terminated. If the live session has been terminated, a user can re-authenticate to the remote server using the example methods of authenticating a user to a service through an application executing on a client computing device described above.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of authenticating a user to a remote server through a client application executing on a computing device, comprising:
receiving user input of a text password for authenticating at a remote server, and storing the text password as credentials on the computing device;
receiving, by the client application, a request to authenticate the user to the remote server using the credentials stored on the computing device;
prompting, by the client application, the user for a gesture-based password in order to use the text password of the credentials;
authenticating, by the client application, the gesture-based password; and
sending, by the client application, the stored credentials to the remote server for authentication in response to successful authentication of the gesture-based password, the text password of the credentials being used for authentication at the remote server;
obtaining indicia of at least one of motion or orientation of the client computing device during input of the gesture-based password;
comparing the indicia of the motion and/or orientation to predefined motion and/or orientation; and
authenticating the gesture-based password based on a combination of comparison results from the sample data of the at least one human gesture and the indicia of the motion and/or orientation.

2. The method of claim 1, further comprising:
determining the gesture-based password to have failed authentication;
removing the stored credentials from the client computing device; and
prompting the user for credentials used to authenticate to the remote server.

3. The method of claim 1, wherein the step of prompting the user for gesture-based password comprises:
prompting the user for at least one human gesture for detection by at least one sensor on the client computing device.

4. The method of claim 3, wherein the at least one human gesture includes at least one hand gesture and the at least one sensor includes a touch-sensitive device.

5. The method of claim 3, wherein the step of authenticating the gesture-based password comprises:
obtaining sample data of the at least one human gesture captured by the at least one sensor; and
comparing the sample data of the at least one human gesture to at least one predefined human gesture.

6. The method of claim, 1 wherein the indicia of the motion and/or orientation of the client computing device is obtained from at least one of an accelerometer, magnetometer, or gyroscope of the client computing device.

7. The method of claim 1, wherein the remote server provides access to a remote desktop of the user and the application is a client used to access the remote desktop.

8. The method of claim 7, wherein the remote desktop is running on a virtual machine.

9. The method of claim 1, further comprising:
generating the request to authenticate in response to the application being brought to a foreground execution state from a background execution state.

10. A non-transitory computer-readable storage medium comprising instructions, which when executed in a client computing device, causes the client computing device to carry out the steps of:
receiving user input of a text password for authenticating at a remote server, and storing the text password as credentials on the computing device;
receiving, by the client application, a request to authenticate the user to the remote server using the credentials stored on the computing device;
prompting, by the client application, the user for a gesture-based password in order to use the text password of the credentials;

authenticating, by the client application, the gesture-based password; and sending, by the client application, the stored credentials to the remote server for authentication in response to successful authentication of the gesture-based password, the text password of the credentials being used for authentication at the remote server;

obtaining indicia of at least one of motion or orientation of the client computing device during input of the gesture-based password;

comparing the indicia of the motion and/or orientation to predefined motion and/or orientation; and authenticating the gesture-based password based on a combination of comparison results from the sample data of the at least one human gesture and the indicia of the motion and/or orientation.

11. The non-transitory computer-readable storage medium of claim 10, further comprising:

determining the gesture-based password to have failed authentication;

removing the stored credentials from the client computing device; and prompting the user for credentials used to authenticate to the remote server.

12. The non-transitory computer-readable storage medium of claim 10, wherein the step of prompting the user for gesture-based password comprises:

prompting the user for at least one human gesture for detection by at least one sensor on the client computing device.

13. The non-transitory computer-readable storage medium of claim 10, wherein the step of authenticating the gesture-based password comprises:

obtaining sample data of the at least one human gesture captured by the at least one sensor; and comparing the sample data of the at least one human gesture to at least one predefined human gesture.

14. A computing system configured to support access to a remote server over a network, comprising:

at least one sensor to identify human gestures;

a non-transitory, computer-readable medium containing credentials that include a text password for authenticating at a remote server; and a processor to run a client application programmed to provide a first component that receives a request to authenticate a user to the remote server using the stored credentials, and a second component that prompts a user for a gesture-based password comprising at least one human gesture using the at least one sensor and sends the stored credentials to the remote server for authentication in response to successful authentication of the gesture-based password, the text password of the credentials being used for authentication at the remote server;

at least one additional sensor to detect at least one of motion or orientation of the client computing system;

wherein the application is programmed to obtain indicia of at least one of motion or orientation of the client computing device from the at least one additional sensor during input of the gesture-based password, compare the indicia of the motion and/or orientation to predefined motion and/or orientation, and authenticate the gesture-based password based on a combination of comparison results from the sample data of the at least one human gesture and the indicia of the motion and/or orientation.

15. The client computing system of claim 14, wherein the application is programmed to determine the gesture-based password to have failed authentication, remove the stored credentials from the client computing system, and prompt the user for credentials used to authenticate to the remote server.

16. The client computing system of claim 14, wherein the gesture-based password includes at least one hand gesture and the at least one sensor includes a touch-sensitive device.

17. The client computing system of claim 14, wherein the application is programmed to obtain sample data of the at least one human gesture captured by the at least one sensor and compare the sample data of the at least one human gesture to at least one predefined human gesture.

* * * * *